Sept. 24, 1968 F. K. BECKER ET AL 3,403,340

AUTOMATIC MEAN-SQUARE EQUALIZER

Filed Nov. 21, 1966 4 Sheets-Sheet 1

INVENTORS F.K. BECKER
L.N. HOLZMAN
E. PORT
H.R. RUDIN, JR.
BY J.P. Kearns
ATTORNEY

AUTOMATIC MEAN-SQUARE EQUALIZER

Filed Nov. 21, 1966

AUTOMATIC MEAN-SQUARE EQUALIZER

Filed Nov. 21, 1966 4 Sheets-Sheet 3

3,403,340
Patented Sept. 24, 1968

3,403,340

AUTOMATIC MEAN-SQUARE EQUALIZER

Floyd K. Becker, Colts Neck, Louis N. Holzman, Lincroft, Erich Port, Red Bank, and Harry R. Rudin, Jr., Lincroft, N.J., assignors to Bell Telephone Laboratories, Incorporated, Murray Hill, Berkeley Heights, N.J., a corporation of New York Filed Nov. 21, 1966, Ser. No. 595,885
9 Claims. (Cl. 325—42)

This invention relates to the correction of the distorting effects caused by transmission channels of limited frequency bandwidth on either analog or digital information signals and in particular to improvements in the use of transversal equalizers for such purposes.

In the copending patent application of R. W. Lucky, Ser. No. 472,146 filed July 15, 1965, now Patent No. 3,375,473, basic principles for automatically adjusting the multipliers in a transversal filter equalizer in accordance with the differences in the impulse response of an actual transmission channel and an ideal transmission channel to identical test pulses are disclosed. Because of the error criterion employed, this equalizer has become known as the mean-square equalizer. In that application both the actual and ideal channels are assumed to be operating at baseband without any intermediate frequency translations. Of critical importance in the proper functioning of this equalizer is the synchronization of the transmitted test pulse as received with the receiver generated test pulse. Lucky proposed use of the detected peak of the received pulse to trigger the receiver pulse generator. Time delays involved between the time of peak detection and the actual generation of the local pulse necessitated a certain amount of empirical delay compensation adjustment to realize optimum performance of the equalizer. Without proper synchronization between the two test pulses effective equalization is impossible.

It is accordingly an object of this invention to improve upon the Lucky equalizer to adapt it to real transmission channels.

It is another object to adapt the mean-square equalizer to the automatic equalization of the passbands of real transmission channels, and not merely the baseband.

It is a further object to derive the error signals on which multiplier adjustments in a transversal equalizer are based from duplicate continuous test patterns rather than from isolated test pulses.

According to this invention, a transversal filter is adjusted to equalize the frequency-domain response of a real transmission channel at a carrier-derived passband by the use of identical pseudo-random word generator signals at the transmitting and receiving terminals of the channel. The complete equalization technique proceeds in steps prior to transmission of information signals over the channel. In the first step the unmodulated carrier wave is transmitted over the channel. Based on a comparison of the received carrier phase appearing at a reference tap on the equalizer with the phase of a receiver generated carrier wave, the latter is adjusted to remove any difference in phase. In the second step the word generators are brought into approximate synchronism by continuously varying the phase of a receiver generated timing signal until a strong cross-correlation between the received word as it appears at the reference tap of the equalizer and the receiver generated word is detected. Upon detection of such cross-correlation phase variation of the receiver timing signal is stopped. Cross-correlation between identical pseudo-random words is indicated by the appearance of strong response peaks at intervals equal to the word length. In the third step the word generators are brought into precise synchronism by further varying the phase of the receiver generated timing signal until the cross-correlation of the time derivative of the receiver generated word with the received word as it appears at the reference tap of the equalizer is substantially zero. In the final step the multiplying attenuators on the delay line of the transversal equalizer are incrementally adjusted according to cross-correlation of the individual outputs on the delay line taps due to the received word which has traversed the actual transmission channel with an error signal derived from the difference between the summed output of the transversal equalizer and the output of the receiver generated word which has traversed a simulated ideal reference transmission channel.

Each multiplying attenuator at the taps on the delay line portion of the transversal equalizer includes a correlator for multiplying the error signal by the individual tap output and slicing the resultant product to obtain its polarity and an adjustable attenuator incrementally stepped by an up-down counter driven by the sliced samples from the cross-correlator.

The baseband output of the receiver word generator is translated up to the same passband in which the received word lies by means of the accurately phased demodulating carrier wave established in the first step. The frequency is recovered from the pilot tones and any carrier frequency offset imparted by the transmission channel is automatically compensated. The demodulating carrier phase is adjusted by a comparison of the reconstructed carrier phase with the actual received carrier phase.

After synchronization of the receiver word generator in steps two and three the equalization per se proceeds in a fourth step at an unsynchronized sampling rate of about 10 Hz. for a period of time long enough to insure that optimum attenuator adjustments have been realized. At this period of time the overall transmission characteristic of the transmission channel over the width of a voiceband is caused to match the ideal transmission characteristic for all practical purposes. The ideal reference characteristic itself is unrestricted in choice.

Once the transmission channel is optimally equalized according to the above procedure normal message transmission ensues.

An important advantage obtained from the correlation of random word generator outputs instead of peak detection of the outputs of pulse sources to control an automatic transversal equalizer is that operation is possible in the presence of considerable noise and delay distortion in the transmission channel.

Further objects, advantages and features of this invention will become apparent from a consideration of the following detailed description and the drawings in which.

Figure 1:
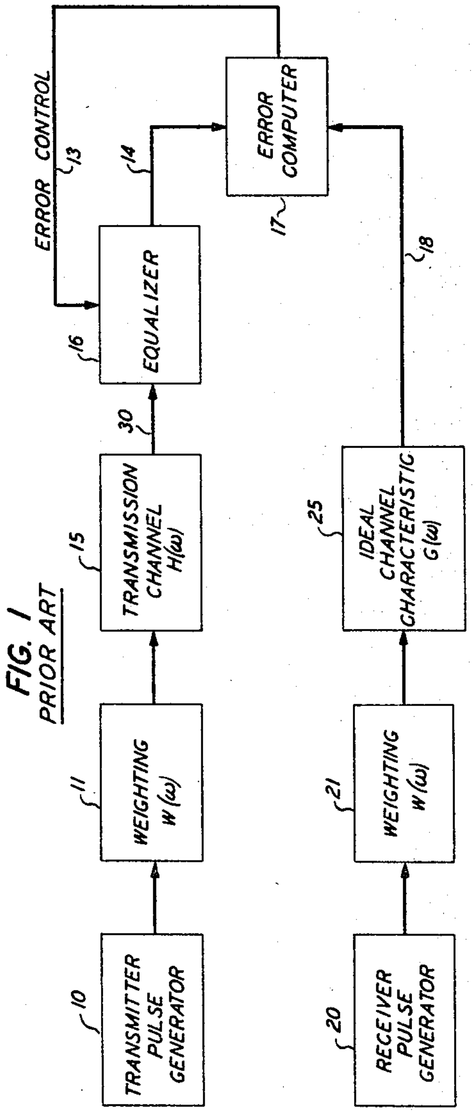
FIG. 1 is a simplified block diagram of the basic prior art mean-square analog transversal equalizer as disclosed by Lucky.

FIG. 1 is a block diagram of the generalized mean-square equalizer of the cited Lucky application. Identical impulse generators 10 and 20 are located at the respective transmitter and receiver terminals of a transmission channel 15. Channel 15 is assumed to be linear but subject to phase and amplitude distortion.

The output of channel 15 on line 30 enters equalizer 16, which includes transmission delay means with equally spaced tapping points. When the peak impulse response is aligned at a reference tap therein, the remaining taps yield samples of leading and lagging distortion components. These leading and lagging distortion components are operated on by adjustable attenuators and adjusted in amplitude and polarity so that an alegbraic summation with the reference tap component effectively cancels such distortion components.

In the mean-square equalizer pulses identical to those generated at pulse generator 10 are also generated in the receiver by pulse generator 20. The output of the latter traverses a filter 25, having a reference response here called ideal but which is actually a desired response. The ideal response on line 18 is compared with the equalized response on line 14 in error computer 17, which is essentially a difference amplifier. If the peaks of the signals on lines 14 and 18 are properly synchronized, the difference signal on line 13 will be proportional to the response error and is usable to adjust the attenuators in equalizer 16 until the leading and lagging response samples are made equal to similar samples of the ideal or desired response characteristic. If these samples, and hence the spacing of the taps on equalizer 16, are at least as closely spaced as the reciprocal of twice the highest frequency of interest in an information signal ultimately to be equalized by equalizer 16, transmission channel 15 will be compensated over the bandwidth of interest in the frequency domain as well as in the time domain.

To facilitate practical realizaiton attenuators in equalizer 16 are adjusted incrementally over a series of test impulses until the error at each tap is reduced below the magnitude of the increment chosen.

Figure 2:
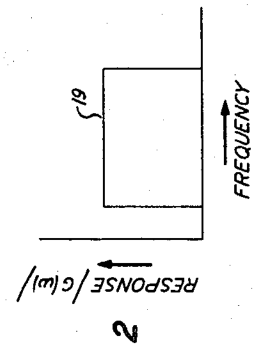
FIG. 2 is a waveform diagram of the ideal amplitude-frequency response of a band-limited transmission channel.

FIG. 2 is a waveform diagram of an ideal response characteristic 19 with sharp frequency cut-off at both upper and lower frequency limits, that is, flat frequency response within the band and zero response outside the band. Since sharp cut-offs as shown are not physically realizable, certain controlled roll-offs are usually adopted.

Figure 3:
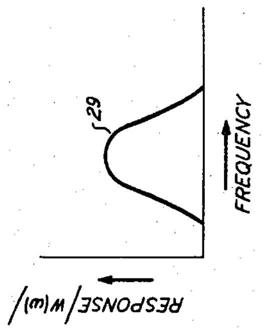
FIG. 3 is a waveform diagram of the amplitude-frequency response of the arbitrary error weighting function.

FIG. 3 is a waveform diagram of a response with controlled roll-offs used to provide an arbitrary spectral weighting. Waveform 29 is the raised cosine response. Such a response is obtained by the use of identical weighting filters 11 and 21 in tandem with respective pulse generators 10 and 20.

The notion of the mean-square equalizer begins in the frequency domain. The channel transmission characteristic $H(\omega)$ is to be equalized so that it best resembles the ideal or desired channel characteristic $G(\omega)$. A mean-square error criterion is employed. Stated mathematically, the distortion to be minimized is $$D''=\int_{-\infty}^{\infty}|H(\omega)-G(\omega)|^2d\omega \qquad (1)$$

The error is given a spectral weighting $W(\omega)$ to achieve smooth rolloffs at the channel band edges. The best equalization fit is then concentrated where $W(\omega)$ is greatest. The distortion is be minimized is then $$D'=\int_{-\infty}^{\infty}|H(\omega)-G(\omega)|^2|W(\omega)|^2d\omega \qquad (2)$$

This minimization of distortion can be carried out in the time domain, where transversal filters are operable, so that, by known principles of Fourier analysis $$D'=\int_{-\infty}^{\infty}\{[h(t)-g(t)]*w(t)\}^2dt \qquad (3)$$

where * denotes convolution and $h(t)$, $g(t)$ and $w(t)$ are time functions corresponding to $H(\omega)$, $G(\omega)$ and $W(\omega)$.

The equalization process is accomplished through the use of a transversal filter having a tapped transmission delay means with taps at $\tau$ seconds apart and associated attenuators with multiplying factors $c_n$, $c_n$ being capable of variation over a range of plus and minus unity gain.

Equalizer 16 in FIG. 1 may be described accordingly as having the function $$h(t)=\sum_n c_n x(t-n\tau) \qquad (4)$$

where $x(t)$ is the input of the equalizer, $h(t)$ is its output, and $\tau$ is the tap spacing. When Equation 4 is substituted into Equation 3, the result is $$D'=\int_{-\infty}^{\infty}\{[\sum c_n x(t-n\tau)-g(t)]*w(t)\}^2dt \qquad (5)$$

The distortion D′ is minimized by setting the partial derivatives of Equation 5 with respect to $c_n$ to zero. Thus, for a particular multiplying factor $c_j$ selected from the available factors $c_n$ and related specifically to attenuation of the output of the $j$th tap of the equalizer, $$0=\frac{\partial D'}{\partial c_j}=2\int_{-\infty}^{\infty}[Wh(t)-Wg(t)]Wx(t-j\tau)dt \qquad (6)$$

where $Wh(t)=w(t)*h(t)$, $Wg(t)=w(t)*g(t)$ and $Wx(t-jr)=w(t)*x(t-jr)$.

Equation 6 indicates that the distortion D′ is minimized by setting the attenuator at the $j$th tap of the delay means to that value which forces the correlation between the error signal (bracketed term) and the $j$th tap voltage to zero. When the output of the correlator is other than zero, the algebraic sign of the output reveals the direction of change of attenuator setting necessary to reduce the distortion by incremental steps. For a practical embodiment the bandwidth to be equalized is assumed to be the voiceband width of about 3000 Hz. Thus, the maximum allowable tap spacing in the equalizer is $$\tau=\frac{1}{2\times 3000}=167 \text{ microseconds}$$

Figures 4, 5:
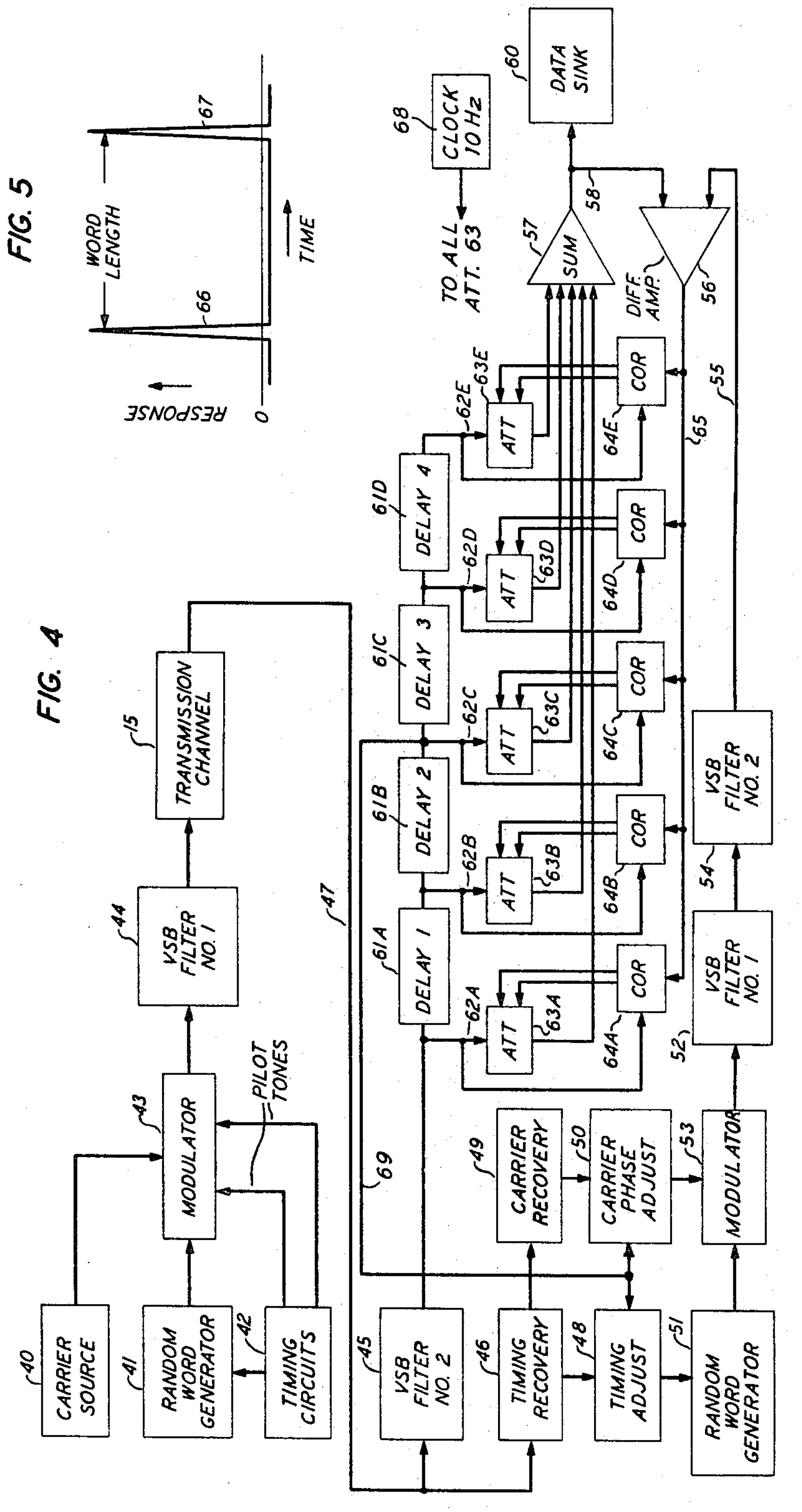
FIG. 4 is a block diagram of an illustrative embodiment of a mean-square transversal equalizer applied to a vestigial sideband data transmission system according to this invention.
FIG. 5 is a waveform diagram resulting from a correlation of identical pseudo-random word generator outputs.

According to this invention, the mean-square equalizer can be adapted to the equalization of the passband of a carrier-modulated wave and transmitter and receiver test sources can be synchronized precisely in the presence of carrier wave phase displacement and frequency offset. FIG. 4 is an illustrative embodiment of this invention as applied to a vestigial sideband data transmission system. Random word generators are employed as signal sources rather than pulse generators as shown in FIG. 1.

The vestigial sideband data transmission system to which this invention is applied in the specific embodiment of FIG. 4 is more fully disclosed in the copending application of F. K. Becker, Ser. No. 459,659 filed May 28, 1965. In that system efficient bandwidth utilization is achieved by modulating the intelligence signal onto a carrier wave and suppressing all but a vestige of the upper sideband. In order to facilitate carrier and timing recovery at the receiver band-edge pilot tones are added to the transmitted signal. These pilot tones are advantageously related to the carrier frequency and to the data symbol rate by relatively simple differences and fractions of differences. This is a high-speed, multilevel, amplitude-modulated system for voiceband transmission. Bit rates up to 9600 per second on a symbol rate of 2400 per second are achieved by precision control of carrier phase and frequency offset, an automatic gain control circuit and an error-control arrangement. An important contributor to this achievement is a preset automatic equalizer which equalizes the impulse response of the transmission channel.

For reference purposes the carrier frequency there employed is 2400 Hz.; the symbol timing rate is 2400 Hz.; the upper band-edge pilot tone is 3000 Hz. and the lower band-edge pilot tone, 600 Hz.

The overall vestigial sideband data transmission system comprises broadly a transmitting terminal, a transmission channel and a receiving terminal. At the transmitting terminal multilevel encoded data is modulated onto a carrier wave from carrier source 40 in modulator 43 and filtered in vestigial sideband filter No. 1 designated 44 before application to transmission channel 15. Timing circuits 42 generate synchronizing clock signals for the data source and also band-edge pilot tones for application to modulator 43. Carrier source 40 is also controlled conventionally by timing circuits 42.

Transmission channel 15, in addition to introducing amplitude and phase distortion into a traversing signal, also introduces carrier frequency offset due to the use of unsynchronized oscillators at regeneration points within the channel, such as at repeaters, and due also to the use of different transmission media within the channel, such as open-wire, cable and radio links.

At the receiving terminal the distorted signal from channel 15 over circuit 47 is applied first to vestigial sideband filter No. 2 designated 45 and to timing recovery circuit 46. Filter 45 has a slightly different passband than filter 44 at the transmitting terminal in recognition of the frequency offset problem. Timing recovery circuit 46 sorts out the band-edge pilot tones from which a demodulating carrier wave and a symbol timing wave are derived as more fully disclosed in the cited Becker application. An automatic gain control circuit may also be present, but is not shown in FIG. 4.

The filtered output of filter 45 is applied to a mean-square equalizer controlled according to this invention. This equalizer includes transmission delay means comprising equal delay elements 61, adjustably attenuators 63, correlators 64, clock 68 and summing amplifier 57. Tap outputs 62, attenuators 63 and correlators 64 which function together, have the same letter suffixes. The output of summer 57 is operated on in data sink 60 to demodulate and decode the received data. The equalizer is shown with only four delay elements to simplify the drawing. In a practical case many more may be required. A delay $\tau$ as previously specified is provided by each delay element 61.

The mean-square equalizer shown in FIG. 4 replaces the preset zero-forcing equalizer disclosed in the cited Becker application. The mean-square equalizer requires test signal sources at both the transmitting and receiving terminals, whereas the preset equalizer employed a transmitting test pulse generator only. Accordingly, random word generator 41 at the transmitting terminal replaces the data signal source during a conditioning period preceding message transmission. The receiving terminal also includes identical random word generator 51. The problem resolved here is that of synchronizing word generators 41 and 51. Both generators operate at baseband. The output of transmitting generator 41 is modulated onto the carrier wave as though it were a message signal. The output of receiving generator 51 must also be translated to the equivalent carrier position. Due to the aforementioned carrier offset equivalent carrier positions are not identical. Therefore, the demodulating carrier wave must take account of such carrier offset. This is done in carrier recovery circuit 49. The demodulating carrier is adjusted in phase in carrier phase adjust circuit 50 as more fully explained below.

Since generators 41 and 51 develop word patterns of fixed length and pattern, word synchronization in addition to bit synchronization is necessary. For this purpose timing adjust circuit 48 is provided. Its operation is more fully described below in conjunction with FIGS. 6 and 7.

The word- and bit-synchronized output of receiver word generator 51, after modulation onto the frequency-offset-compensated recovered carrier wave, is filtered in vestigial sideband filters 52 and 54, which match transmitting and receiving filters 44 and 45, and applied to difference amplifier 56 by way of conductor 55. The summed output of summer 57 is applied to another input of difference amplifier 56 on lead 58. In effect the transmitter random word arrives at difference amplifier 56 distorted by channel 15 and partially compensated by the equalizer, and the receiver random word arrives at difference amplifier 56 in synchronism with the transmitted word but free of distortion. The receiver word has been shaped in filters 52 and 54, which may be regarded as the weighting filters of FIG. 1. The instantaneous differences between these two words obtained in amplifier 56 thus constitute an error signal, by means of which attenuators 63 can be automatically adjusted.

The vestigal sideband filters in both transmitter and receiver terminals are intended to impart a raised cosine shaping to the actual signal and the reference signal. In the specific embodiment the overall amplitude-frequency characteristic rises from zero at 600 Hz. through a maximum at 2400 Hz., the carrier frequency, and falls again to zero amplitude at 3000 Hz. The response designated $G(\omega)$ and $W(\omega)$ in FIG. 1 are implicit in these filters. The response $H(\omega)$ is the combined response of the transmission channel and the equalizer.

The preliminary conditioning operation of the arrangement of FIG. 4 proceeds in three steps. First, the proper carrier phase is established. Second, the receiver word timing is coarsely adjusted. Finally, the receiver word timing is finely adjusted.

In the first step of the conditioning procedure an unmodulated carrier-wave burst with accompanying pilot tones from carrier source 40 and timing circuit 42 is transmitted through channel 15. Through the medium of timing recovery circuit 46 and carrier recovery circuit 49 the demodulating carrier is reconstructed from the pilot tones as more fully described in the aforesaid Becker application. The demodulating carrier thus reconstructed is compensated for carrier frequency offset. The unmodulated carrier wave traverses filter 45 and the first two delay units 61A and 61B and is tapped off at the junction between delay units 61B and 61C by way of conductor 69. The demodulating carrier is compared in phase with the received carrier on conductor 69 in carrier phase adjust circuit 50. On the basis of any phase difference phase adjust circuit 50 is set to deliver a demodulating carrier component in proper phase to modulator 53. Phase shift adjuster 50 may be of any well-known type either electronically or servo controlled.

In the following steps of the conditioning procedure random word generators 41 and 51 are energized. These word generators are constructed according to the principles of W. J. Cadden Patent No. 2,951,230 granted Aug. 30, 1960. They illustratively comprise a seven-stage shift register with an exclusive-OR feedback from the last two stages to the iuput. The resulting output is a repetitive 63-bit pseudo-random binary sequence.

In the general theory of harmonic analysis, as expressed in "Statistical Theory of Communication" by Y. W. Lee (John Wiley and Sons, Inc., New York 1960) particularly in Chapter 2 by way of example, the correlation principle plays an important rôle. When two periodic waves having the same fundamental frequency but a difference in phase are multiplied together and the product is averaged over a complete period of the fundamental frequency, a new function called the correlation function results. This new function is periodic at the same fundamental frequency, but is now a function of the phase displacement between the waves being correlated rather than time with an arbitrarily chosen origin. When in addition the two functions being correlated are made up of rectangular pulses, the correlation function is triangular with peaks at phase displacements of 0, $2\pi$, etc. Where the two waves are in fact identical, the resulting function is called the autocorrelation function. The correlation function has particular value when one or the other of the waves being correlated is perturbed by noise or phase distortion. The true peaks of the autocorrelation function rise well above any minor peaks due to noise or impulse response echoes.

The correlation principle is employed in the present invention to synchronize the receiver word generator with the transmitter word generator. As already mentioned, both generators 41 and 51 generate identical words of 63-bit length. The correlation function of these two words is diagrammed in FIG. 5. The abscissa is time and the ordinate, response. Peaks 66 and 67 occur with a displacement equal to the word length of 63 bits and at an amplitude 63 times the negative response at other times. Any minor peaks due to noise or echoes of the transmitted signal would be far below this level.

Figure 6:
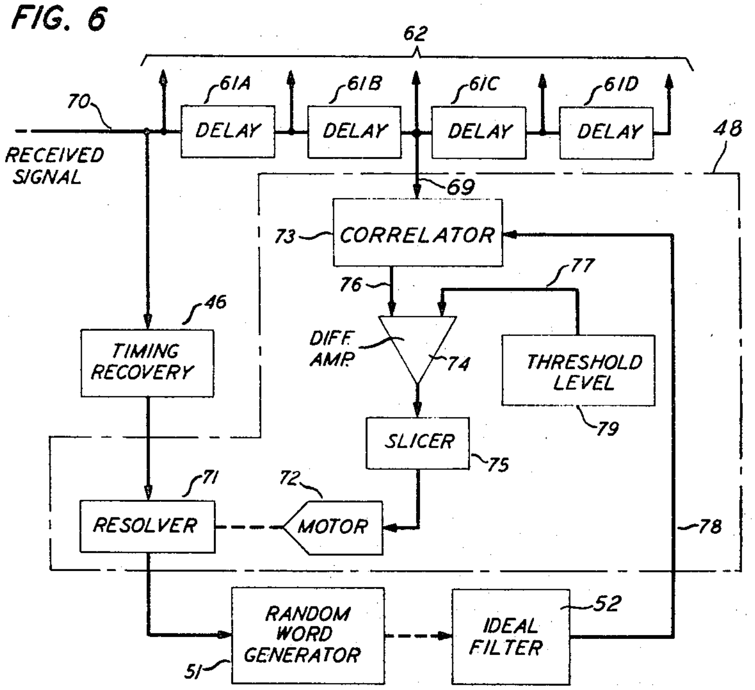
FIG. 6 is a block diagram of a modification of the mean-square equalizer of this invention used in establishing coarse synchronism between the transmitter and receiver word generators.

In the second and third steps of the conditioning procedure the major spike of the autocorrelation function is isolated from any minor spikes and then the absolute peak of the major spike is located. FIG. 6 diagrams a representative arrangement for timing adjust block 48 of FIG. 4 to locate the major spikes.

In FIG. 6 the received signal on conductor 70, after passing through appropriate line filters, is applied to delay means 61 in the equalizer and to timing recovery circuit 46. The timing signal as recovered from the pilot tones is adjusted in phase in timing adjust circuit 48, shown in broken line outline. Timing adjust circuit 48, as constituted in FIG. 6, comprises resolver 71, motor 72, correlator 73, threshold circuit 79, difference amplifier 74, and slicer 75. The timing signal is passed through resolver 71, an electromechanical system well known in the art. Driven by motor 72 over the dotted shaft connection shown, resolver 71 varies the phase of the receiver generated timing signal and applies it to generator 51. Resolver 71 is capable of continuously varying the phase of the timing signal. The output of the generator is modulated to passband as shown in FIG. 4 and shaped in filter 52. The broken line connection between generator 51 and filter 52 represents such modulation. The shaped and varying output on conductor 78 is incident on correlator 73, which also accepts the received signal from the reference tap on the equalizer by way of conductor 69. In correlator 73, as more fully explained below, the two word signals are multiplied and filtered to yield the correlation function of FIG. 5. The correlation output on conductor 76 is compared with a reference signal from threshold level circuit 79 on conductor 77. The threshold level is established empirically so that difference amplifier 74 will have an effective output only at a major spike of the correlation function. Slicer 75 responds to such a difference signal and produces an output which stops the rotation of motor 72. Until the output of correlator 73 reaches the chosen threshold voltage, motor 72 has continuously rotated resolver 71 and thereby changed the phase of the timing signal. Motor 72 is preferably geared down to permit a slow change of phase over a long observation time of several word lengths. The phase of the timing signal remains stationary at the end of this step.

Figure 7:
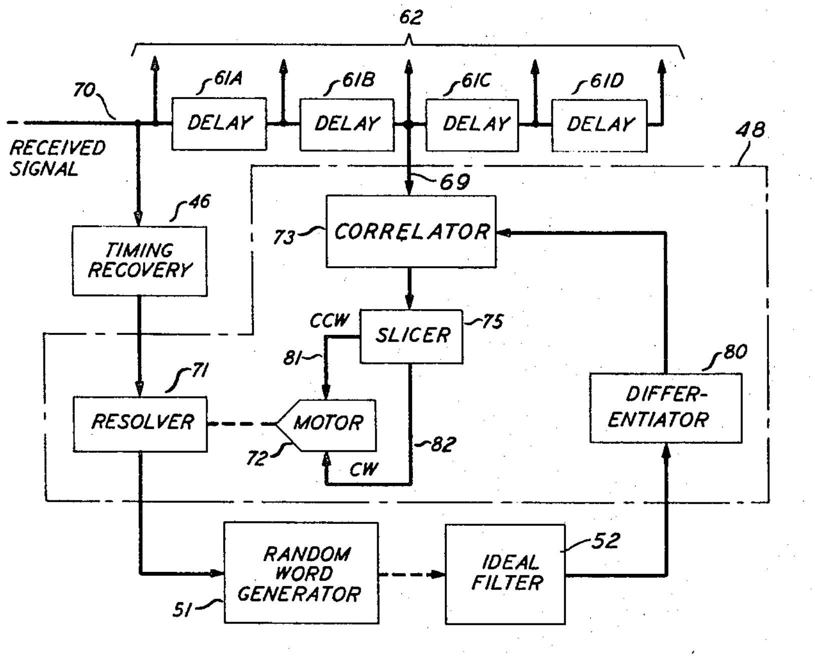
FIG. 7 is a block diagram of a further modification of the mean-square equalizer of this invention used in establishing precise synchronism between the transmitter and receiver word generators.

Since the correlation spike may have significant width, operation of the synchronization circuitry is continued in the third step by further modifying timing adjust circuit 48 as shown in FIG. 7. The circuits of FIGS. 6 and 7 are substantially the same except that difference amplifier 74 and threshold circuit 79 are no longer needed in FIG. 7. Slicer 75 is arranged to have its complementary outputs appear on conductors 81 and 82 to control the direction of rotation of motor 72. Differentiator 80 is connected in tandem with the output of generator 51.

The translated and shaped output of generator 51 is now differentiated with respect to time in differentiator 80 to find the absolute peak of the major spike located in FIG. 6. The time derivative of the output of generator 51 is correlated with the received signal on conductor 69 in correlator 73 and the resultant output sliced in zero-level slicer 75. The output of the latter slowly rotates motor 72 and resolver 71 in the direction appropriate to adjust the derivative of the autocorrelation function to zero. The motor is locked in its final position and equalization proceeds. Random word generators 41 and 51 are now optimally synchronized.

Returning now to FIG. 4, the actual equalization is accomplished in conjunction with the continued generation of the respective random words in generators 41 and 51. The transmitted random word is modulated onto a carrier wave from source 40 in modulator 43 under the control of timing circuits 42. Band-edge pilot tones are added and the resultant composite wave is filtered and shaped in vestigial sideband filter 44 and applied to transmission channel 15. The received modulated word is further filtered at the receiver in vestigial sideband filter 45 and applied at carrier passband level to the transversal equalizer. Time-spaced samples of the received wave are obtained on leads 62, connected as shown, to the input, intermediate junction points and output of delay line 61. These equally time-spaced samples traverse appropriate attenuators 63, whose outputs are combined in summer 57. Summer 57 may advantageously be a two-stage operational amplifier as more fully disclosed in the copending application of F. K. Becker, R. W. Lucky and E. Port, Ser. No. 396,836, filed Sept. 16, 1964, now Patent No. 3,292,110. The initial settings of attenuators 63 are arbitrary.

The received signal is also applied to timing recovery circuit 46 and carrier recovery circuit 49. The timing adjust circuit 48 and carrier phase adjust circuit 50 have been set according to the conditioning procedures above. Therefore, the random word from generator 51 is in synchronism with the received word and is modulated in modulator 53 to the same passband, with due regard to carrier phasing and frequency offset, as the received word. The reference word from generator 51 is further filtered and shaped in filters 52 and 54 (matching filters 44 and 45 in the path of the received word) to the desired weighted form. The received word on conductor 58 and the receiver generated word on conductor 55 are compared in difference amplifier 56. The output of amplifier 56, which is conventional, constitutes a continuing error signal proportional to the deviation of the equalized word from the desired word. This error signal on conductor 65 is applied in common to the plurality of correlators 64 as shown. Each correlator 64 receives at another input an unattenuated sample of the received word on one of leads 62. Specifically, the transmitted word sample on lead 62B is applied to correlator 64B, by way of example. Correlators 64 multiply the two input signals together and average and slice the products to produce increase and decrease gain signals for the related attenuators 62 on the vertical leads shown. A representative correlator is described more fully below in connection with FIG. 8. Appropriate counter-controlled attenuators are disclosed in the aforesaid Becker-Lucky-Port application.

Attenuators 63 are adjusted incrementally upon receiving a clock pulse from clock 68. The frequency of clock 68 is in effect a sampling frequency for a random process and thus is not synchronized with the bit rate of the transmitted and reference words. Its output affects all attenuators 63, although the connections are omitted to avoid cluttering the drawing. A clock frequency of 10 Hz. is used to insure essentially independent samples. At each such clock pulse from source 68 attenuators 63 are incrementally adjusted in accordance with the polarity of the outputs of correlators 64 in a direction to reduce the instantaneous error signals to zero.

The time required to achieve optimum equalization within the number of delay units 61 and incremental steps of attenuators 63 depends on the initial distortion. This period can be shortened by operating clock 68 initially at a comparatively high frequency comparable to the fundamental frequency of the word generators and later at the 10-Hz. rate.

Figure 8:
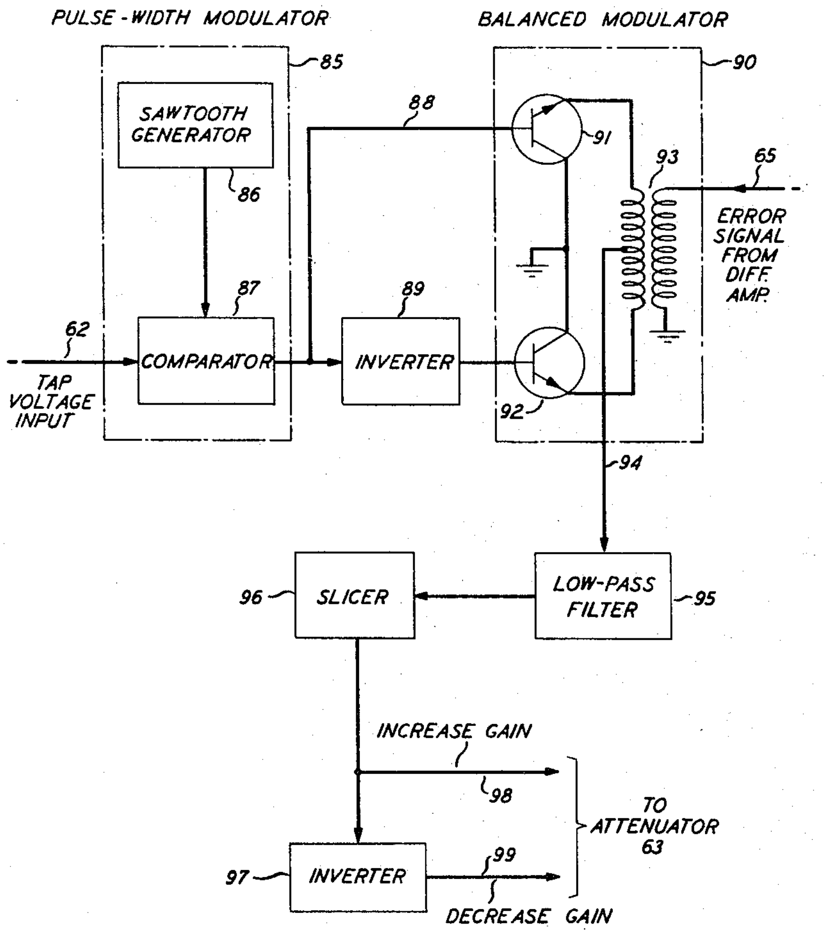
FIG. 8 is a block schematic diagram of a correlator useful in the practice of this invention.

FIG. 8 is a block diagram of a representative correlator as used in block 73 of FIGS. 6 and 7 and blocks 64 in FIG. 4. The function of a correlator is to multiply together two signals of the same fundamental frequency and integrate the resultant product. The instant correlator comprises a pulse-width modulator 85, a balanced modulator 90, an integrator 95, a slicer 96 and an inverter 97.

Pulse-width modulator 85 comprises a linear sawtooth wave generator 86, whose alternate cycles are of opposite polarity, and a comparator 87. The output of generator 86 is applied to one input of comparator 87 and the tap voltage on a lead 62, to the other input. Generator 86 is free running at a speed rapid with respect to variations in the tap voltage. Comparator 87 is in effect a variable-level slicer. The tap voltage is a slowly varying alternating-current wave and its amplitude at any time determines the slicing level for comparator 87. At a tap voltage of zero, comparator 87 slices at zero level and the output of modulator 87 on lead 88 is a symmetrical square wave. At other values of tap voltage the output becomes an unsymmetrical square wave with predominating positive portions for a negative input and vice versa. In other words the output of modulator 85 has an output whose average direct-current level is proportional to the tap voltage, but of opposite polarity.

Balanced modulator 90 conventionally comprises a pair of switching transistors 91 and 92 of the same conductivity type with collector electrodes grounded in common and a two-winding center-tapped transformer 93. The emitter electrodes of transistors 91 and 92 are connected to opposite terminals of the center-tapped winding of transformer 93. The center tap furnishes the output. The grounded other winding is connected to receive the error signal on lead 65 from difference amplifier 56 in FIG. 4 or the lead 69 from the reference tap on the equalizer in FIGS. 6 and 7.

The direct output of pulse-width modulator 85 is applied by way of lead 88 to the base electrode of transistor 91 in balanced modulator 90 and the inverted output through inverter 89 to the base electrode of transistor 92. The error signal on lead 65 (or lead 69 in FIGS. 6 and 7) is thus effectively multiplied by the tap voltage on lead 62. The output on lead 94 is integrated over several word intervals in low-pass filter 95 to obtain a slowly varying direct current and to eliminate undesirable high-frequency components. Filter 95 advantageously has a cut-off frequency of about 10 Hz.

The output of filter 95 becomes zero if there is no cross correlation with the error signal, negative when the cross-correlation is positive and positive when the cross-correlation is negative. This output is sliced in conventional slicer 96 to produce a negative output on lead 98 as a signal to increase the gain of the associated attenuator 63 incrementally so as to tend to reduce the error signal. Inverter 97 is supplied to produce a negative decrease gain signal on lead 99 when the cross-correlation is negative.

There are various other correlators known in the art but the pulse-width modulator type was chosen here because of its dynamic range and because both the tap voltage and error signals are alternating currents.

Once equalization has been achieved the word generators are removed from the circuit and regular message transmission proceeds.

While this invention has been disclosed in terms of a specific embodiment employing vestigial sideband transmisison, numerous modifications adapted to other transmission modes within the skill of the art are possible without departing from the spirit and scope of the appended claims.

What is claimed is:

1. In combination with a nonideal transmission channel and a transversal equalizer having a plurality of equally spaced taps, an adjustable attenuator at each tap and a summing circuit common to the outputs of all attenuators, apparatus for optimally adjusting said equalizer to impart a desired frequency response to a passband of said channel comprising means at each terminal of said channel generating identical quasi-random data word patterns as test signals, means at each terminal of said channel translating the respective word patterns from said generating means to equivalent passbands of said channel, means at the transmitting terminal inserting signaling components bearing a fixed relation to the transmitter carrier frequency and the data timing, means at the receiving terminal responsive to said signaling components accompanying the transmitted signal and controlling said translating means thereat for extracting a demodulating carrier frequency compensated for frequency offset introduced by said channel with respect to the transmitter carrier frequency, means also responsive to said signaling components recovering a timing wave for said word generator at the receiver terminal, reference filter means at the receiver terminal shaping the receiver generated word pattern according to the desired frequency response, means responsive to a correlation of the word pattern received at the receiving terminal with the passband word pattern generated thereat by both peak amplitudes and time derivatives of such amplitudes resulting from such correlation producing word synchronization between the respective word patterns, means deriving an error signal from the difference between the synchronized receiver terminal word pattern after traversing said reference filter means and the transmitter word pattern after traversing said channel and equalizer, means correlating said error signal with each of the tap outputs of said equalizer, and means responsive to said correlating means incrementally adjusting said attenuators in a sense to minimize said error signal.

2. Apparatus for establishing optimum settings for the attenuators in a transversal equalizer to correct the frequency response characteristic of a passband of a nonideal transmission channel comprising means at the respective transmitter and receiver terminals of said channel generating identical repetitive quasi-random word patterns as test signals, means translating the transmitter word pattern to said passband, said translated word pattern being accompanied by signaling components bearing a fixed relationship to the modulating carrier frequency and to the bit synchronization of said word, means at the receiver terminal responsive to said signaling components generating a demodulating carrier wave compensated for phase shift and frequency offset imparted by said channel, means at the receiver terminal also responsive to said signaling components reconstructing a bit synchronization timing wave for the word-generating means thereat, means at the receiver terminal controlled by said carrier-generating means translating the receiver word pattern to the passband of said channel, reference filter means at the receiver terminal shaping the translated receiver word pattern according to the desired frequency response, means at the receiver terminal responsive to a correlation between the translated transmitter and receiver word patterns shifting the phase of the timing wave from said reconstructing means to achieve word synchronization between said receiver and transmitter word-generating means, means deriving an error signal from the difference between the receiver word from said reference filter means and the transmitter word from said equalizer, means correlating said error signal with time-spaced samples of the transmitter word traversing said equalizer, and means responsive to said correlating means incrementally adjusting the attenuators in said equalizer to minimize said error signal.

3. Apparatus for establishing optimum settings for the attenuators in a transversal equalizer to correct the frequency response characteristic of a passband of a nonideal transmission channel comprising a transmitter terminal at one end of said transmission channel, and a receiver terminal at the other end of said transmission channel:

said transmitter terminal comprising first signal generator means having as an output repetitive quasi-random binary words of fixed length, a carrier-wave source, a timing wave source having as outputs signal components bearing a fixed relation to the frequency of said carrier wave and to the bit rate of said first signal generator, means synchronizing said first signal generator means with said timing wave source, means under the joint control of said carrier-wave and timing source translating binary words from said first signal generator and said signal components to a passband of said transmission channel, and first filter means in tandem with said translating means and said channel shaping a composite transmitted wave;

said receiver terminal including said equalizer and comprising second filter shaping means in tandem with said translating means and said channel, means responsive to the signal components in said composite transmitted wave recovering a bit timing wave and a demodulating carrier wave corrected for phase shift and frequency offset imparted by said transmission channel, second signal generator means controlled by the timing wave from said recovering means having as an output repetitive binary words matching those of said first signal generator means, means controlled by said demodulating carrier wave translating the binary words from said second signal generator to the said channel passband, reference filter means in tandem with said last-mentioned translating means having the desired frequency response characteristic to which said passband is to be equalized, means responsive to a correlation between the unequalized transmitted wave and the wave from said reference filter adjusting the phase of the timing wave from said recovering means until an amplitude exceeding a predetermined threshold level is obtained, means responsive to a correlation between the unequalized transmitted wave and the time derivative of the wave from said reference filter further adjusting the phase of the timing wave from said recovering means until the peak amplitude of the correlation response is obtained, means taking the difference between the equalized transmitted wave and the wave from said reference signal as an error signal, means correlating said error signal with time spaced samples of the transmitted wave derived in said equalizer, and means periodically and incrementally adjusting said attenuators in accordance with the outputs of said correlating means to minimize said error signal.

4. In combination with a nonideal transmission medium and a transversal equalizer having a plurality of equally spaced taps, an adjustable attenuator at each tap and a summing circuit, apparatus for optimally adjusting said equalizer to impart a desired frequency response to a passband of said medium comprising means transmitting an unmodulated carrier wave through said passband, means recovering a demodulating carrier wave from said unmodulated carrier wave at the other terminal of said medium compensated for phase shift and frequency offset due to traversing said medium, means generating identical binary pseudo-random word patterns of fixed length at both terminals of said medium, means modulating said word patterns to said passband at both terminals of said medium, the word pattern at one terminal being modulated on said carrier wave and the word pattern at the other terminal being modulated on said demodulating carrier wave, first filter means matching the one word pattern to said passband, second reference filter means shaping the other word pattern to the desired frequency response for said passband, means synchronizing the bit timing of said generating means, means synchronizing the word timing of said generating means according to the peak amplitude and derivative of such amplitude of the correlation function between said two word patterns, means deriving an error signal from the difference between the one word pattern after traversing said medium and equalizer and the other word after traversing said reference filter means, means correlating said error signal periodically with time-spaced samples of the one word pattern at taps in said equalizer, and means incrementally adjusting said attenuators in a direction to minimize said error signal.

5. The combination of claim 4 in which said transmitting means includes timing means furnishing band-edge pilot tones whose frequencies are related to the frequency of said carrier wave and to said bit timing rate by their difference, said modulating means suppresses the direct carrier wave component from its output, and said first and second filter means suppresses all but a vestige of the lower sideband from the outputs of said modulating means.

6. The combination of claim 4 in which said means synchronizing the word timing of said generator means comprises means correlating the one word pattern after traversal of said medium with the other word pattern after traversing said reference filter, reference level means having a fixed output threshold below the peak of the correlation function between said word patterns, means taking the difference between said threshold level and the output of said correlation means, a motor-resolver pair continuously varying the phase of the output of said bit-timing synchronizing means, and slicing means responsive to the output of said difference-taking means for stopping said motor-resolver pair when the output of said correlating means exceeds said threshold level.

7. The combination of claim 6 in which said means synchronizing the word timing of said generators further comprises means differentiating the other word pattern after traversing said reference filter, further means correlating the output of said differentiating means with the one word pattern after traversing said reference filter, further slicing means responsive to the output of said further correlating means having complementary outputs according to the polarity of the input, and means responsive to the complementary outputs of said further slicing means causing said motor-resolver pair to rotate the phase of the bit timing in the proper direction for precise word synchronization.

8. The combination of claim 4 in which said correlating means comprises
 a pulse-width modulator having an output whose average value is proportional to the amplitude of an input signal,
 a balanced modulator,
 means applying the direct and inverted outputs of said pulse-width modulator to switching inputs of said balanced modulator,
 means impressing said error signal on said balanced modulator,
 the output of said balanced modulator being proportional to the product of said error signal and the input signal to said pulse-width modulator,
 low-pass filter means integrating the output of said balanced modulator, and
 slicing means operating on the output of said low-pass filter to provide increase and decrease count signals to said attenuators.

9. In combination with a vestigial sideband data transmission system having at a transmitter terminal a carrier wave source, a timing wave source providing band-edge pilot tones bearing a fixed relation to the carrier wave frequency and the data symbol rate, a balanced modulator and a vestigial sideband filter suppressing all but a vestige of the modulator output; at a receiver terminal a line filter, a carrier recovery circuit controlled by the received pilot tones, a timing recovery circuit and a transversal equalizer including a tapped delay line, an adjustable attenuator for each delay-line tap, and a summing circuit; and a nonideal transmission channel joining the two terminals:
 apparatus for adjusting said attenuators to compensate a passband of said transmission channel to a desired frequency response comprising an identical random word generator at each of said terminals, the transmitter generator being timed by said timing wave source and delivering its output to said vestigial sideband filter by way of said modulator and the receiver generator being timed by said timing recovery circuit,
 a modulator controlled by said carrier recovery circuit translating the output of the receiver generator to said passband,
 a reference filter having the desired frequency response connected to said last-mentioned modulator,
 means correlating the transmitter and receiver word generators to effect word synchronization by peak and derivative of peak response of the correlation function,
 means deriving an error signal from the difference between the outputs of said summing circuit and said reference filter,
 means individually correlating said error signal with time-spaced samples of the wave traversing said delay line at the taps thereon to obtain up-down counting signals for the attenuators at said taps,
 a clock source periodically gating said counting signals to said attenuators, and
 means incrementally adjusting said attenuators responsive to said gated counting signals.

References Cited

UNITED STATES PATENTS 3,283,063 11/1966 Kawashima et al. ---- 333—28 X

HERMAN KARL SAALBACH, *Primary Examiner.*

PAUL L. GENSLER, *Examiner.*